INVENTOR.
Roy L. Swank

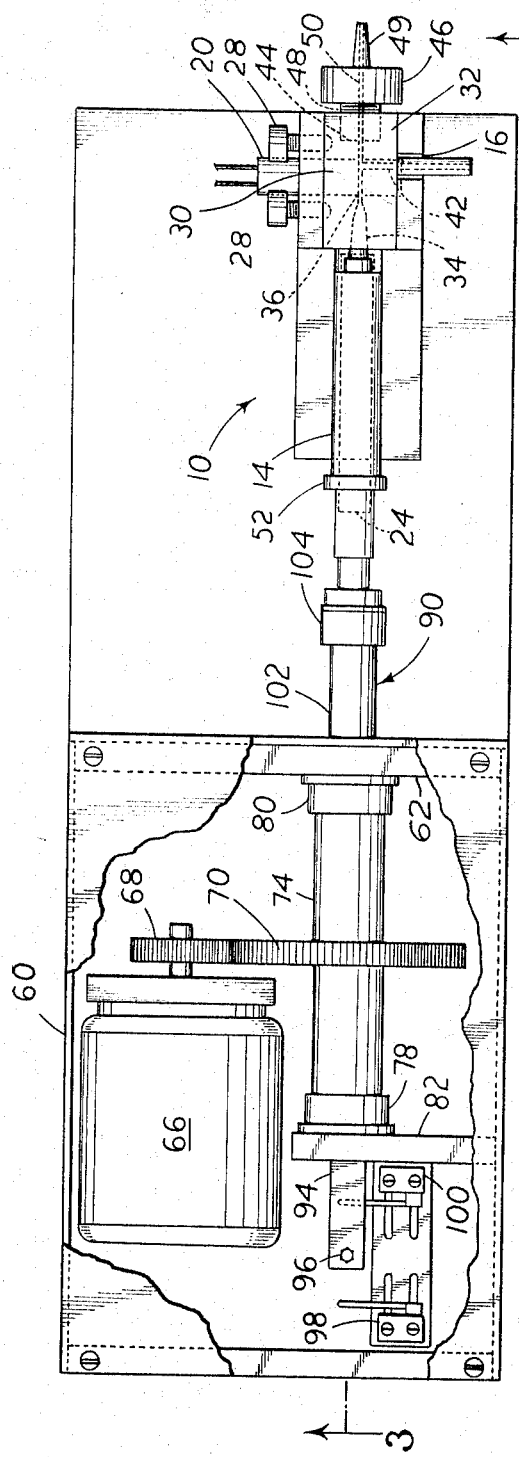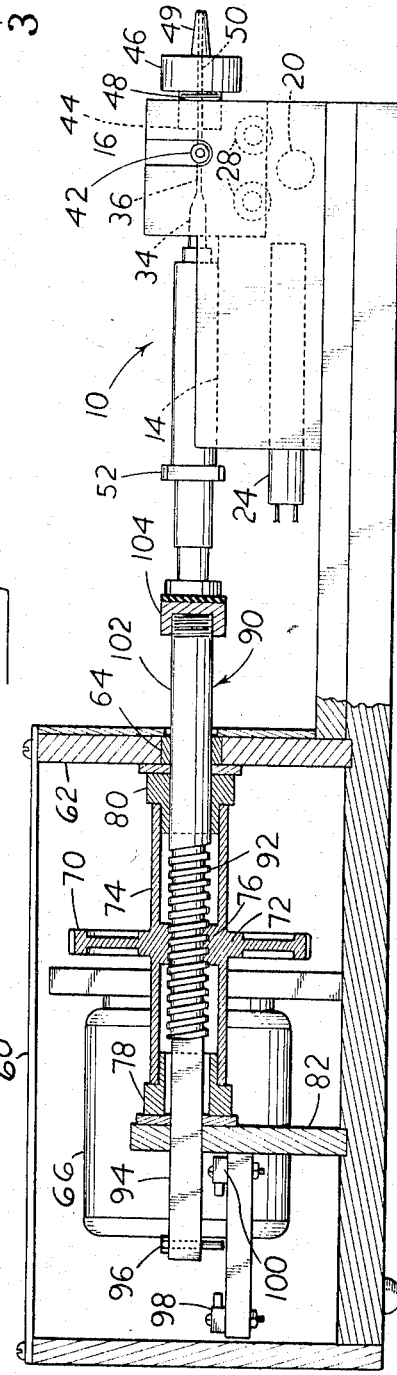

3,266,299
Patented August 16, 1966

1

3,266,299
CONSTANT FLOW PRESSURE FILTER APPARATUS
Roy L. Swank, 4400 SW. Scholls Ferry Road, Portland, Oreg.
Filed June 14, 1965, Ser. No. 469,034
8 Claims. (Cl. 73—61)

This application is a continuation in part of the application of Roy L. Swank, Serial No. 167,862, filed January 22, 1962, for Constant Flow Pressure Filter Apparatus now abandoned, the same in turn being a continuation in part of the application of Roy L. Swank, Serial No. 107,844, filed May 4, 1961, for Method and Apparatus for Treating Blood Preliminary to Its Use in Transfusions.

This invention relates to constant flow, pressure filter apparatus of the class particularly useful in testing blood preliminary to its use in transfusions.

It has become routine to employ blood bank blood in general surgical, and medical transfusions as well as in heart surgery. The blood is prepared by withdrawing it from donors, adding a preservative comprising heparin, or acid-citrate-dextose (ACD) solution, and then storing it under carefully controlled conditions until its use is required.

Whether it is used directly in transfusions or for priming heart-lung apparatus, there at times have been observed in the patient an ensuing cessation of circulation and various other reactions not attributable to mismatching of blood types. This regrettable result has been recognized as a function of blood storage duration and it therefore has been common practice to discard blood bank blood after it has been in storage for a period of 21 days.

It recently has been discovered, however, that when blood bank blood is stored, its leucocyte and platelet components are altered, developing characteristics which are responsible for the transfusion reactions described above when they are introduced into the human circulatory system. The alteration is a function of time and is evidenced by increased adhesiveness of the blood components and hence increased difficulty of filtration.

It is an important purpose of the present invention to provide apparatus which tests this property of the blood and which accordingly indicates suitability for use in blood transfusions. The apparatus also may be applied generally, however, to the measurement of the adhesive or viscosity characteristics of blood and other fluids derived from various sources and subjected to diverse treatments.

In the drawings:

FIGS. 2 and 3 are plan and elevation views, respectively, of a drive unit used in conjunction with the pump and filter unit of FIG. 1, FIG. 3 being partly in section.

Figure 1:
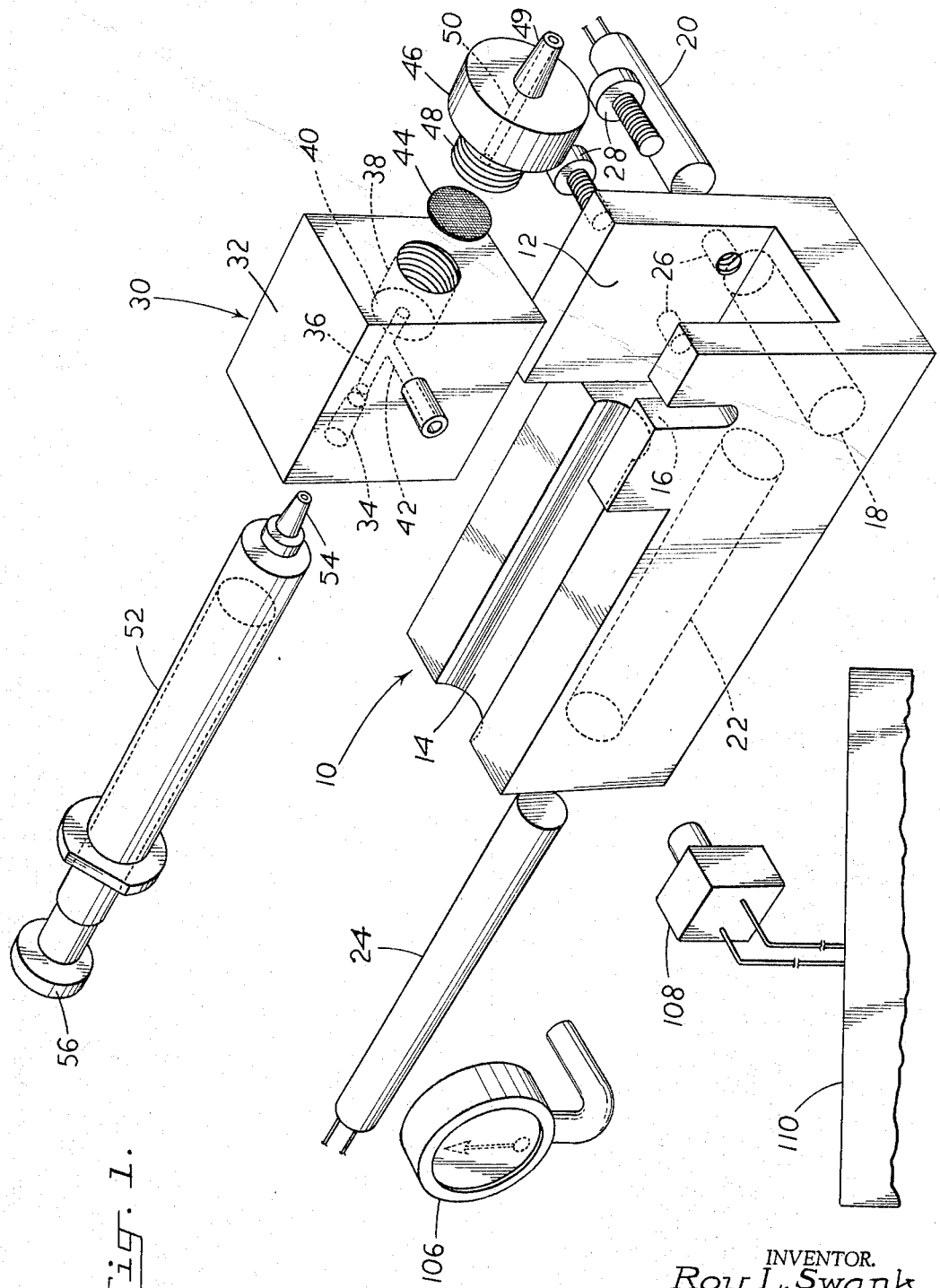
FIG. 1 is an exploded perspective view of a pump and filter unit for use in the herein described constant flow pressure filter apparatus.

The pump and filter unit, illustrated in detail in FIG. 1, is supported on a base indicated generally at 10. This element of as assembly comprises a rectangular piece of metallic aluminum or other heat-conducting material. It is formed with a first recess 12, designed to contain the filter assembly, and a communicating, longitudinally extending bed 14, designed to support a syringe or other piston-type pump.

Base 10 also is formed with a slot 16 communicating with recess 12 and designed to receive a pressure gauge conduit; with a transverse recess 18 for the accommodation of an electric heating element 20; and a longitudinal recess 22 for the accommodation of a thermostat 24 which is in an electric circuit with heating element 20.

Spaced, internally threaded perforations 26 also are present. These are designed to accommodate thumb screws 28 having for their function locking in recess 12 a filter unit indicated generally at 30.

In its preferred form, the filter unit comprises a rectangular plastic block 32 having therethrough a longitudinal conduit substantially aligned with bed 14 in the base. The conduit is formed in three stepped sections, i.e. an inwardly tapered infeed section 34, a central section 36 of somewhat restricted diameter and an outfeed section 38 of diameter sufficient to form an internally threaded well or reservoir having a shoulder 40 of substantial area.

Block 30 is designed to be received snugly in recess 12 of the base, where it is locked releasably in place by thumb screws 28. A branch conduit 42 forms a T connection with central section 36, upstream from shoulder 40. A filter screen 44 of suitable material and mesh size is seated in well 38, flush with shoulder 40.

The screen is held in place by plug 46 which serves the dual purposes of a screen retainer and nozzle discharge for the filtrate. It includes a threaded extension 48 dimensioned to be received in the threaded bore of well 38 and provided with an outer bearing surface which presses against screen 44, holding it securely against shoulder 40.

Member 46 also is provided with a discharge nozzle 49 communicating with a longitudinal bore 50 which is aligned with the stepped conduit through block 32. The filtrate passing through screen 44 accordingly traverses conduit 50 and is discharged from nozzle 49.

Although the elements of the foregoing filter unit may be sized to suit particular applications, it has been found that when the unit is to be applied to the filtration of blood, conduit section 36 advantageously may have a diameter of $89/1000$ of an inch and screen 44 may have multiple apertures 20 microns square.

This is of importance since it is desirable to employ a screen having openings of uniform and predetermined size. It is desirable that the size of the openings be uniform in order to obtain reproduceable and significant results. It is desirable that the screen openings be of predetermined size in order to pass the red cell content of the blood while retaining the blood aggregates.

Red blood cells are sensitive to rupture (hemolysis) on contact with filtering media. Hence the screen openings must be sufficiently large to prevent hemolysis. Also, since blood clots in less than a minute, the screen openings must be sufficiently large to insure that the blood will pass through the filter rapidly enough to complete the test in about 30 seconds. On the other hand if the screen openings are too large, the blood aggregates will pass through the screen. Hence it is desirable for the present purposes to employ a screen having multiple apertures 20 microns in diameter, broadly from 10 to 30 microns in diameter.

Pump means are provided for pumping the fluid to be filtered through screen 44.

When filtering blood, a positive-displacement, piston-type pump such as syringe 52 may be employed to advantage. The syringe is fitted with a tapered tip 54 dimensioned to be received snugly in tapered aperture 34 in block 32. It also is provided with a head 56 which may be used to operate the syringe manually but which preferably establishes a bearing point for a uniform speed, mechanical drive illustrated in FIGS. 2 and 3.

The pump drive unit is enclosed in a housing 60, the front wall 62 of which has an opening fitted with a bushing 64. The housing encloses a synchronous, reversible, electric motor 66, to the shaft of which is fixed a gear 68.

Gear 68 meshes with a companion gear 70 provided with a centrally bored hub 72. The hub in turn receives a sleeve 74 to the bore of which is welded or otherwise fixed an internally threaded nut 76. The open ends of the sleeve are mounted on bearings 78, 80 supported, respectively, on a standard 82 and on front panel 62 of housing 60.

The foregoing assembly thus provides a rotor for driving in reciprocating axial motion a screw, indicated generally at 90, and formed in three sections. A central section 92 is threaded and engages nut 76. A flattened terminal section 94 extends rearwardly through bearing 78 and through a square opening in standard 82, thus securing the screw against rotation. It carries on its rear terminal portion a contact pin 96 positioned for contacting in turn a pair of limit switches 98, 100 which are in an electric circuit with reversible electric motor 66.

The forward portion 102 of the screw is mounted in bearing 80, extending outwardly through bushing 64 in face plate 62 of housing 60. It carries a rubber faced head 104 threaded onto its leading end.

Screw 90 is aligned with syringe or pump 52, with head 104 in working contact with head 56 on the plunger of the syringe. Accordingly, as the screw advances, driven at a uniform linear speed by motor 66, it advances the plunger of the pump at a corresponding uniform linear speed.

As the plunger advances, it pushes the contents of the pump through screen 44 in filter block 32, filtering the fluid at a uniform rate. As a necessary consequence the pressure required to force the fluid through the screen increases in direct measure with clogging of the screen by the solid content of the fluid. Means are provided for measuring the pressure thus developed.

Two alternate means for accomplishing this purpose are indicated in FIG. 1. In the first, a simple pressure measuring gauge 106 is connected to the opening of branch conduit 42. This gives a direct measure of the developed pressure.

In the second, the stem of a transducer 108 is connected to the same opening. The stem is filled with saline and transmits the pressure of the filtering system to a diaphragm which, in turn, controls the flow of an electric current through an electrically connected recording instrument 110. This plots the developed pressure against the filtering time, giving a graphic record of the filtering operation.

Operation

The operation of the herein described constant flow filter pressure apparatus, as applied to the filtration of blood, is as follows:

Filtering unit 30 is provided with a freshly cleaned screen 44 which is held in position against shoulder 40 by plug 46. Branch conduit 42 is preloaded with saline, and the block placed in recess 12 of base 10, where it is secured in place by thumb screws 28.

Heater 20, controlled by thermostat 24, is activated and the system allowed to come to the predetermined temperature which, in a typical case, may be 38° C. Syringe 52 then is filled with the liquid to be filtered and placed in bed 14 with tip 54 of the syringe in sealing engagement with tapered opening 34 in the block. Pressure recorder 110 is energized and screw 90 started on its advancing stroke by closing the switch to synchronous motor 66.

Ram head 104 on the screw thereupon engages head 56 of the plunger in the syringe and advances it at a uniform rate, forcing the fluid contents of the syringe through screen 44. As an accumulation of residue builds up on the screen the pressure developed ahead of it will increase proportionately. This pressure is transmitted through the saline in side passage 42 either to pressure gauge 106 or recording instrument 110, where it may be observed.

A typical sequence employed in the study of fresh and stored human blood is as follows:

The diameter of conduit 36 through the block, the capacity of syringe 52, and the rate of advancement of ram 90 are preselected so that 4 ml. of the test fluid are passed through screen 44 at a uniform rate of 1 ml. per 2.5 seconds, or a total test period of 10 seconds for a 4 ml. test sample.

A control test with normal saline solution (0.9% by weight sodium chloride in distilled water) first is run. This assures the operator that the screen is clean and of the correct specifications.

After air drying the screen and replacing it, the blood sample, either fresh or stored, is drawn into the syringe and forced through the screen. The syringe then is removed and the conduits through the block thoroughly washed. A syringe loaded with saline then is connected to the block and the procedure repeated.

Thus there may be obtained three sets of values. First a control set using normal saline is obtained. Next the pressures resulting when the test fluid is passed through the screen are recorded. Finally, the pressure required for forcing saline through the screen employed in filtering the blood is obtained, this being a measure of the accumulation of storage-altered leucocytes and platelets, or other debris, which has clogged the pores of the screen.

Figure 4:
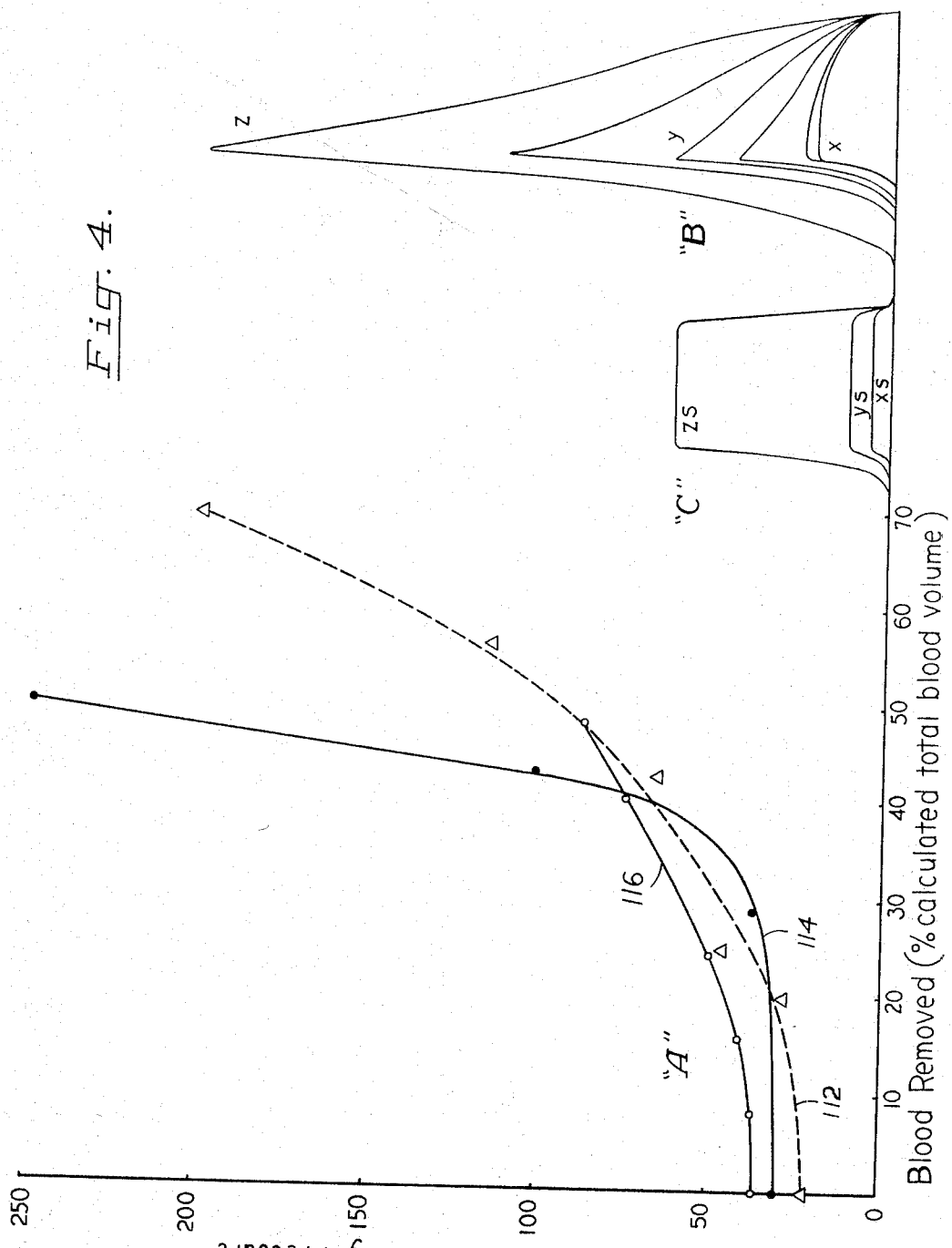
FIG. 4 includes graphs illustrating the results obtained when the presently described filter apparatus is applied to the filtering of blood.

The results of typical runs are given in FIG. 4. The curves of this figure represent the values obtained when blood samples selected periodically during the exsanguination of three experimental animals were filtered through the apparatus of the invention.

Curves 112, 114, 116 of group A are plots of filtering pressure versus percent of blood removed from the animals, at various stages of exsanguination. It is apparent that the viscosity characteristics of the blood are altered markedly with exsanguination.

The curves of groups B and C are not drawn with reference to the abscissa values employed in plotting the curves of group A. Rather, they are tracings made from the record printed by meter 110, which measured the pressures developed while filtering the blood samples of curve 112, there being in group B one curve for each of the points used in locating curve 112, the latter points having been determined by noting the maximum pressure recorded in the graphs of group B.

The plots $xs$, $ys$ and $zs$ of group C are tracings of the recordings made by the meter when filtering the saline controls passed through the screen after filtering selected ones of the samples used in accumulating the data for the graphs of group B, the selected ones being indicated at $x$, $y$ and $z$, respectively.

Thus curve $x$ of group B is a normal curve, and $xs$ is the saline control which follows it. Curve $x$, made during the early stages of exsanguination, rises rapidly and then levels out, indicating that a substantially constant pressure was developed during the latter part of the filtering procedure.

Curve $y$, applicable to a sample withdrawn after about 40% of the blood had been removed, clearly indicates that changes have occurred in the blood as shown by the accumulation of adhesive material on the filter screen. This results in increased resistance to filtration. Curve $ys$, the saline control curve, confirms this observation.

Curve $z$, obtained when running a sample of blood obtained after nearly 70% exsanguination, shows an even greater alteration of the blood, as evidenced by the development during filtration of greatly increased pressures. Confirming saline control curve $zs$ of group C, correspondingly evidences the accumulation of a large amount of clogging material on the filter screen.

These results clearly indicate the desirability of noting carefully the degree of exsanguination when withdrawing from an animal blood to be used for transfusion purposes.

There thus is provided apparatus for filtering fluids such as blood at a constant, uniform, and rapid rate, as well as for measuring and recording, if desired, the pressure developed in the system throughout the entire cycle of operation.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. Constant flow pressure filter apparatus for measuring the amount of aggregate material in fluid blood, comprising
    (a) a conduit comprising a block of material having therethrough a stepped passageway providing a downstream-facing shoulder,
    (b) a filter screen seated against the shoulder of the passageway and having a multiplicity of openings of substantially uniform and predetermined size disposed across said passageway for the collection on the screen of aggregate material in the fluid blood as the latter is forced through the screen,
    (c) a filter screen retainer having a passageway therethrough secured in the passageway of the block downstream from the shoulder and pressing against the screen with the passageway through the retainer communicating with the passageway through the block,
    (d) positive displacement pump means connected to the conduit inlet for passing blood fluid through the conduit at a constant rate,
    (e) and pressure measuring means communicating with the conduit ahead of the filter screen for measuring the pressure developed while filtering the fluid blood, the degree of pressure increase being a measure of the amount of aggregate material in the blood.

2. The apparatus of claim 1 wherein the stepped passageway of the conduit means communicates upstream from the filter screen with a branch passageway and wherein the pressure measuring means comprises a pressure gauge connected in the branch passageway.

3. The apparatus of claim 1 including heating means associated with the block and thermostat control means connected to the heating means for maintaining the block and the fluid contents of the conduits therethrough at a predetermined temperature level.

4. The apparatus of claim 1 wherein the pump means comprises a syringe type pump and wherein the apparatus includes a base provided with a recess dimensioned to receive the block, with clamp means for releasably locking the block in the recess, and with a longitudinally extending bed dimensioned to hold the syringe type pump.

5. The apparatus of claim 1 wherein the pump means comprises a piston-type pump, a screw having a ram head contacting the pump piston and a flattened section and an externally threaded section, guide means mounting the screw and engaging the flattened section thereof for non-rotative longitudinal reciprocation of the screw, a rotor rotatably mounted encircling the screw and having an internally threaded section meshing with the externally threaded section of the screw, and reversible motor means coupled to the rotor for rotating the same at a predetermined speed and driving the piston of the pump.

6. The method of measuring the amount of aggregate material in blood, comprising forcing the blood at superatmospheric pressure through a filter of substantially uniform and predetermined size, as the filter becomes clogged with aggregate material increasing the pressure on the blood to force it through the filter at a substantially constant rate, and simultaneously measuring the pressure of the blood ahead of the filter, the degree of pressure increase being a measure of the amount of aggregate material in the blood.

7. The method of claim 6 including the steps, preliminary and subsequent to the forcing of the blood sample through the filter, of forcing a control liquid free of aggregate material through the filter under pressure and at a substantially constant rate, and simultaneously measuring the pressure of the control liquid ahead of the filter, the degree of pressure increase being a measure of the amount of aggregate material in the blood collected on the filter.

8. Constant flow pressure filter apparatus for measuring the amount of aggregate material in fluid blood, comprising a block of material having therethrough a stepped passageway having an inlet and outlet and an intermediately located shoulder, a filter screen seated against the shoulder and having a multiplicity of openings of constant and predetermined size disposed across said passageway for the collection on the screen of aggregate material in the fluid blood as the latter is forced through the screen, a filter screen retainer secured in the block passageway and pressing against the screen, the retainer having therethrough a passageway communicating with the block passageway, a piston type pump connected to the block passageway inlet for passing fluid blood through the block and communicating retainer passageways at a constant rate, pressure measuring means communicating with the block passageway ahead of the filter screen for measuring the pressure developed while filtering the fluid blood, a base provided with a recess dimensioned to receive the block, clamp means for releasably locking the block in the recess, and a longitudinally extending bed in the base aligned with the block passageway and dimensioned to mount the pump.

References Cited by the Examiner
UNITED STATES PATENTS

| | | | |
|---|---|---|---|
| 2,599,742 | 6/1962 | Boucher et al. | 73—53 |
| 2,724,963 | 11/1955 | Ten Brink | 73—38 |
| 3,172,286 | 3/1965 | Grubb et al. | 73—53 |

DAVID SCHONBERG, *Primary Examiner.*